(12) United States Patent
Carlson et al.

(10) Patent No.: US 7,633,748 B2
(45) Date of Patent: Dec. 15, 2009

(54) CARRIER FOR A MULTIPLE DRIVE ARRAY

(75) Inventors: Grant Edward Carlson, Florissant, CO (US); Karl Heinz Cunha, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 187 days.

(21) Appl. No.: 11/772,189

(22) Filed: Jun. 30, 2007

(65) Prior Publication Data

US 2009/0002934 A1 Jan. 1, 2009

(51) Int. Cl.
  *G06F 1/16* (2006.01)
  *H05K 5/00* (2006.01)
  *A47B 81/00* (2006.01)

(52) U.S. Cl. ............... 361/679.37; 361/724; 312/223.2; 369/75.11; 206/701; 720/652

(58) Field of Classification Search ......... 361/679–686, 361/724–727; 312/223.1, 223.2
  See application file for complete search history.

(56) References Cited

U.S. PATENT DOCUMENTS 7,133,291 B2 11/2006 Carlson et al.
2006/0002077 A1* 1/2006 Carlson et al. .............. 361/685
2007/0230109 A1* 10/2007 Starr et al. .................. 361/685

* cited by examiner

*Primary Examiner*—Jayprakash N Gandhi
*Assistant Examiner*—Nidhi Desai
(74) *Attorney, Agent, or Firm*—McCarthy Law Group

(57) ABSTRACT

A multiple drive array carrier apparatus and associated method is provided with a unitary two-row partition. The unitary two-row partition has a longitudinal end member. A plurality of first support members extend from the end member and support, in turn, a first set of coplanar engagement members. The first engagement members each define apertures configured for passing first fasteners therethrough to affix a first plurality of data storage devices to the first engagement members, defining a first row of data storage devices. A plurality of second support members also extend from the end member and define a second set of coplanar engagement members. Each of the second support members likewise define apertures configured for passing second fasteners therethrough in the same direction as the first fasteners to affix a second plurality of data storage devices to the second support members, defining a second row of data storage devices adjacent to and parallel with the first row.

19 Claims, 7 Drawing Sheets

CARRIER FOR A MULTIPLE DRIVE ARRAY

FIELD OF THE INVENTION

The embodiments of the present invention relate generally to the field of array storage systems and more particularly but without limitation to a carrier for containerizing a plurality of data storage devices to define a multiple drive array storage space to a distributed storage system.

BACKGROUND

Ever-increasing demand for data storage capacity has fostered the development of improved data array storage systems wherein a plurality of data storage devices are electronically linked to function synergistically. Data integrity schemes are also enhanced in such arrays permitting fail-safe redundant storage of data, such as in redundant arrays of independent device ("RAID") systems.

There are a number of challenges facing the array designer. For example, the many and complex mechanical and electrical connections required for each data storage device are multiplied by the number in an array. That is, each and every data storage device requires sufficient mechanical support to isolate the delicate head and disc components from vibration levels that create data transfer errors. Not only must attention be paid to self-excitation, that is, vibration caused by the rotating disc of a data storage device itself, but like attention is required to external excitation sources in such an environment. External excitation can come from other data storage devices in the array, electrical components in the array such as power supplies and fans, and from the installation and/or removal of data storage devices while the array is operational.

As the number of data storage devices in arrays increases, the problems associated with electromagnetic interference containment are exacerbated as well. Properly shielding the data storage devices requires attention paid not only to leak paths between drives in adjacent shelves, but also to the leak paths potentially created by the multiple openings into which each of the plurality of data storage devices is inserted. Adequate shielding of these openings must be provided while still permitting the ability to insert and/or remove a data storage device without disrupting the shielding in place for adjacent data storage devices in the array.

Flexibility can be a problem as well. For instance, traditionally the electrical systems, such as the connector boards, controllers, and connecting buses, are hard-wired for a predetermined number and size of data storage devices in the array. This is required to maintain the electrical integrity of the array while permitting swapping of individual data storage devices. For this reason, the storage shelves and the associated electrical systems are dedicated for the predetermined number and size of data storage devices. Accordingly, because of both mechanical and electrical constraints, an array designed for a particular form factor configuration cannot readily be adapted for use with a different form factor. Also, if a grouping of data storage devices is needed for a particular function, such as mirroring the storage of data, such functionality must conventionally be achieved at the top level host programming level. This requires complex and coordinated programming of many data storage devices.

While various approaches have been proposed in the art to address maximizing the data storage capacity while also providing operable flexibility in the utilization of data storage devices in array storage systems, there nevertheless remains a continued need for improvements in the art. It is to such improvements that the claimed invention is directed.

SUMMARY OF THE INVENTION

In accordance with preferred embodiments of the present invention, an apparatus and method are contemplated for containerizing a plurality of storage devices to form a multiple drive array.

In some embodiments a multiple drive array is provided with a unitary two-row partition. The unitary two-row partition has a longitudinal end member. A plurality of first support members extend from the end member and support, in turn, a first set of coplanar engagement members. The first engagement members each define apertures configured for passing first fasteners therethrough to affix a first plurality of data storage devices to the first engagement members, defining a first row of data storage devices. A plurality of second support members also extend from the end member and define a second set of coplanar engagement members. Each of the second support members likewise define apertures configured for passing second fasteners therethrough in the same direction as the first fasteners to affix a second plurality of data storage devices to the second support members, defining a second row of data storage devices adjacent to and parallel with the first row.

In some embodiments a method is provided for containerizing a plurality of storage devices in a multiple drive array. The method includes positioning a first storage device in a unitary two-row partition having a first receptacle of a first plurality forming a first row of receptacles; affixing the first storage device to the first receptacle by passing fasteners in a direction substantially orthogonal to the first storage device through apertures defined by the first receptacle to engage the first storage device; positioning a second storage device in a second receptacle of a second plurality forming a second row of receptacles, the operable position of the second storage device thereby blocking access to at least one of the fasteners used in the affixing the first storage device step; and affixing the second storage device to the second receptacle by passing fasteners in the same direction as in the affixing the first storage device step through clearance apertures defined by the second receptacle to engage the second storage device.

In some embodiments a multiple drive array is provided with a printed circuit board configured for connecting to a plurality of data storage devices, and means for aligning the plurality of data storage devices in a dense multiple row arrangement by a paired mirrored combination of unitary partition members.

These and various other features and advantages which characterize the claimed invention will become apparent upon reading the following detailed description and upon reviewing the associated drawings.

DETAILED DESCRIPTION

Figure 1:
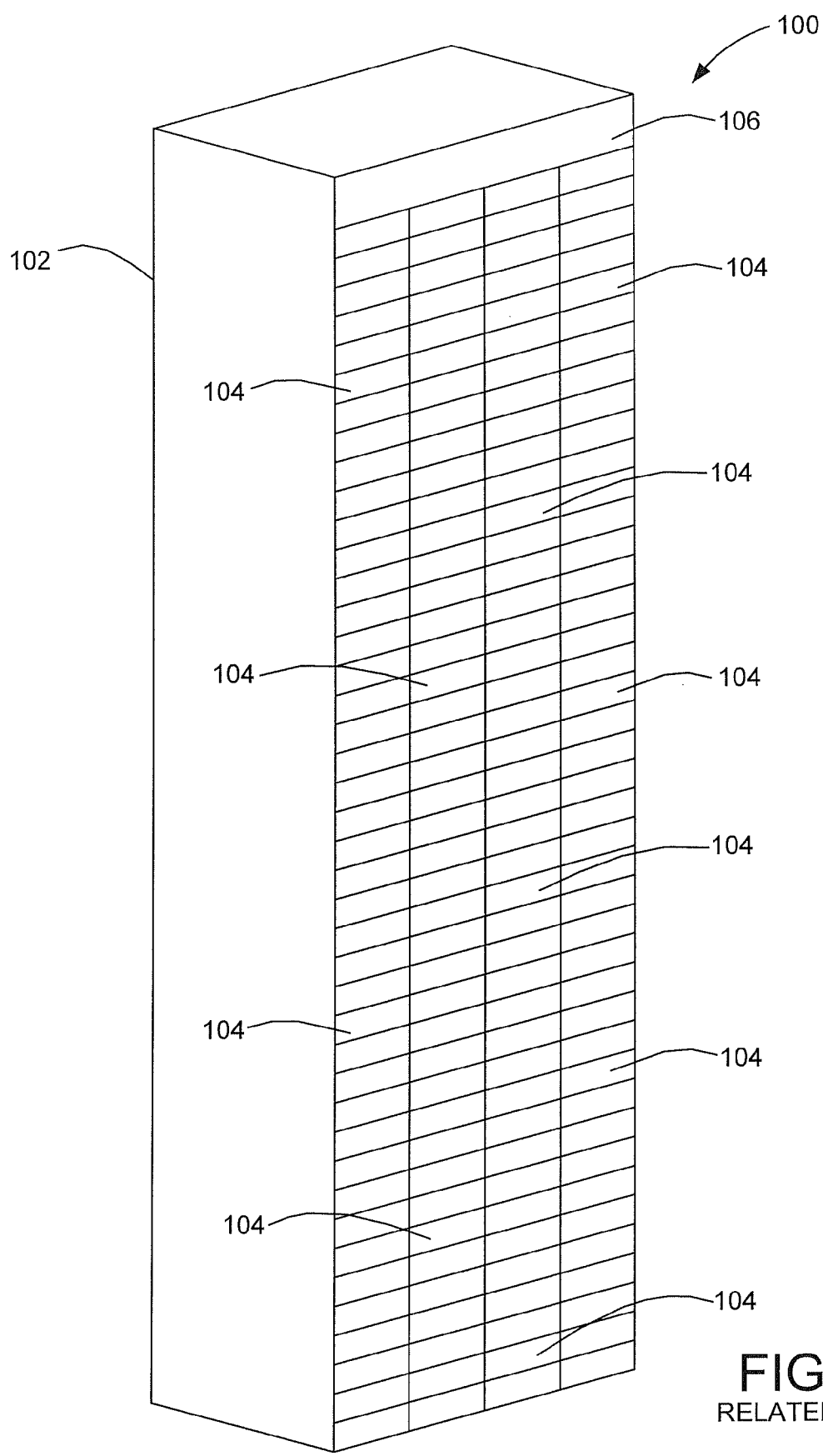
FIG. 1 is an isometric view of an array storage system constructed in accordance with related art solutions.

FIG. 1 is an isometric view of a related art array storage system 100 wherein a cabinet 102 supports a plurality of data storage devices 104. A host 106 is electrically connected to each of the data storage devices 104 so as to provide a bulk data storage arrangement, such as for providing a network interface and/or for employing data integrity schemes such as in a RAID system.

Figure 2:
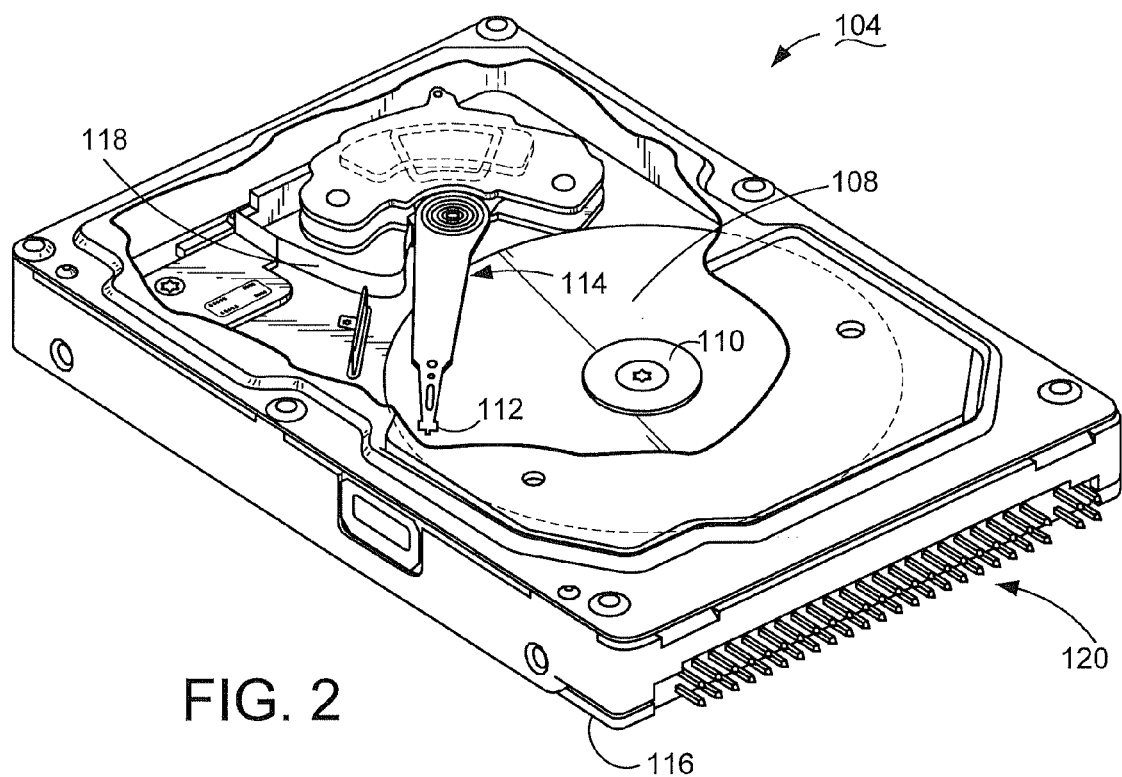
FIG. 2 is an isometric view of a data storage device.

FIG. 2 is an isometric view of a data storage device 104 suited for use with the present invention, in the form of a rotating magnetic media disc drive. A data storage disc 108 is rotated by a motor 110 to present data storage locations of the disc 108 to a read/write head ("head") 112. The head 112 is supported at the distal end of a rotary actuator 114 that is capable of moving the head 112 radially between inner and outer tracks of the disc 108. The head 112 is electrically connected to a circuit board 116 by way of a flex circuit 118. The circuit board 116 is adapted to receive and send control signals controlling the functions of the data storage device 104. A connector 120 is electrically connected to the circuit board 116, and is adapted for connecting the data storage device 104 with control electronics of the array 100.

The array storage system 100 offers one way of combining the storage capability of a number of data storage devices 104. Disadvantageously, however, the individual openings in the cabinet 102 are sized and wired to receivingly engage either individual data storage devices 104, or a fixed number and size of data storage devices 104.

Figure 3:
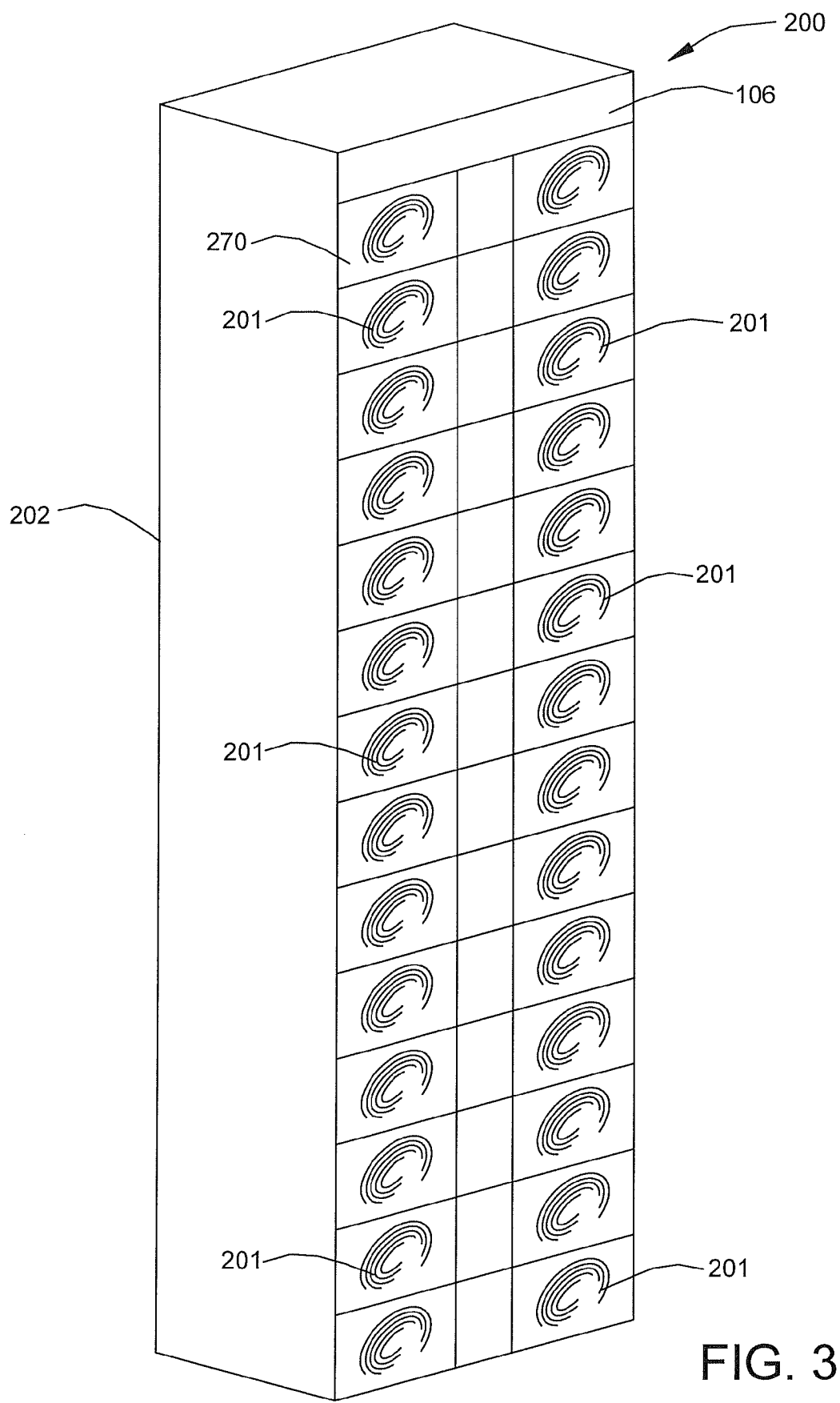
FIG. 3 is an isometric view of an array storage system constructed in accordance with embodiments of the present invention.
Figure 4:
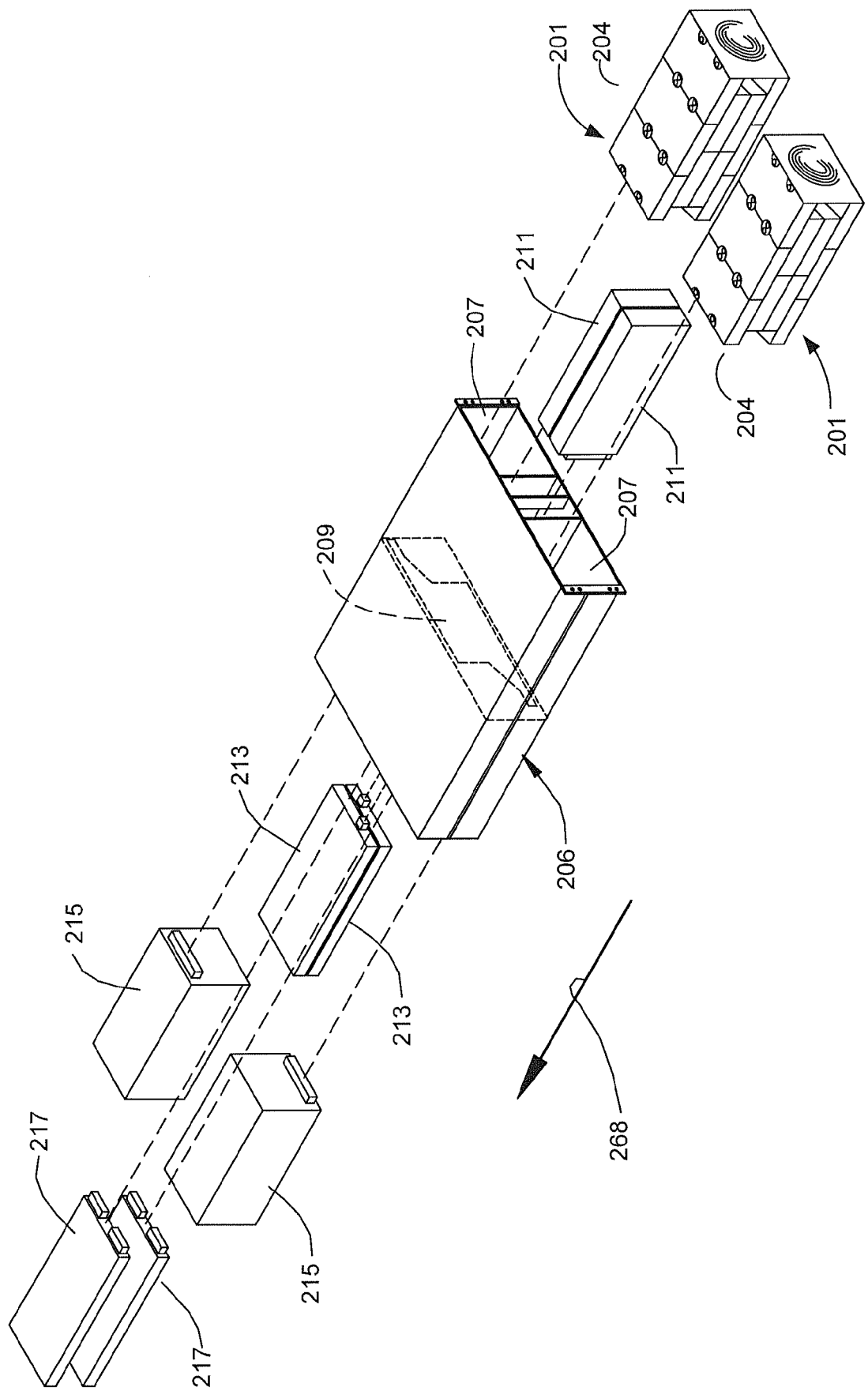
FIG. 4 is an exploded isometric view of portions of the array storage system of FIG. 3.

FIGS. 3 and 4 illustrate an array storage system 200 constructed in accordance with novel embodiments of the present invention, wherein a plurality of multiple drive arrays ("MDAs") 201 are utilized. An MDA 201 generally comprises a convertible plurality of componentized data storage devices 104. By "convertible" it is meant that one or more data storage devices 104 can be readily replaced, added, or removed in an existing MDA 201, or that a different MDA can be utilized that is capable of supporting a different number, size or arrangement of data storage devices 104. By "componentized" it is meant that the data storage devices 104 and associated control electronics in the MDA 201 are integrated so as to be functionally presented to the array 200 as a single component.

A cabinet 202 defines a plurality of cavities into each of which a shelf 206 is receivingly engaged. Each shelf 206 defines one or more cavities 207 into each of which an MDA 201 is receivingly engaged for engagement with a backplane 209. Similarly, the shelf 206 defines cavities for receivingly engaging other electrical modules with the backplane 209, such as, but not limited to, controllers 211, batteries 213, power supplies 215, and interfaces 217.

In the illustrative embodiment of FIG. 4, the shelf 206 defines two cavities 207 for receiving two MDAs 201. Equivalent alternative embodiments contemplate a different number of MDAs 201 per shelf 206. The array storage system 200 comprises a plurality of MDAs 201, each sized in accordance with the respective cavity 207 for an operable mating relationship. Each MDA 201 is adapted to operably support a variable number, size, or arrangement of data storage devices 104. More particularly, this solution provides an array storage system 200 comprising a shelf 206 for receivingly engaging an MDA 201 comprising a carrier 204 from a plurality of different carriers, each carrier of the plurality having common exterior dimensions defining an operable mating relationship with the cavity 207 of the shelf 206, and each carrier of the plurality differentiated by interior supporting features for supporting a selected number, size, or arrangement of data storage devices 104.

Figure 5:
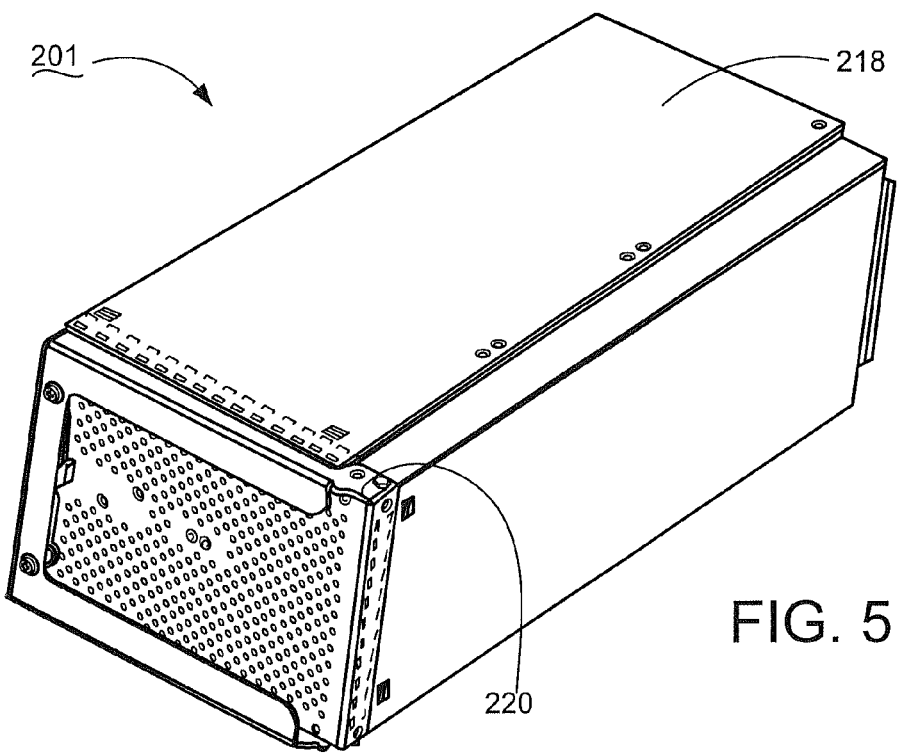
FIG. 5 is an isometric view of the multiple drive assembly (MDA) portion of FIG. 4 in accordance with embodiments of the present invention.

FIG. 5 is an isometric view of the MDA 201 in embodiments wherein a full enclosure 218 supports a hinged access door 220. The MDA 201 is receivingly engageable within the cavity of the cabinet 202 (FIG. 4). In some embodiments of the present invention, the shelf 206 is fixed within the cabinet 202 and the MDA 201 is insertable and removable from the shelf 206 so that individual data storage devices 104 can be readily added, removed or replaced. In other embodiments of the present invention, an MDA 210 can be replaced with another one having different data storage device supporting features for electrically connecting a different selected number, size, or arrangement of data storage devices 104 in the shelf 206.

Figure 6:
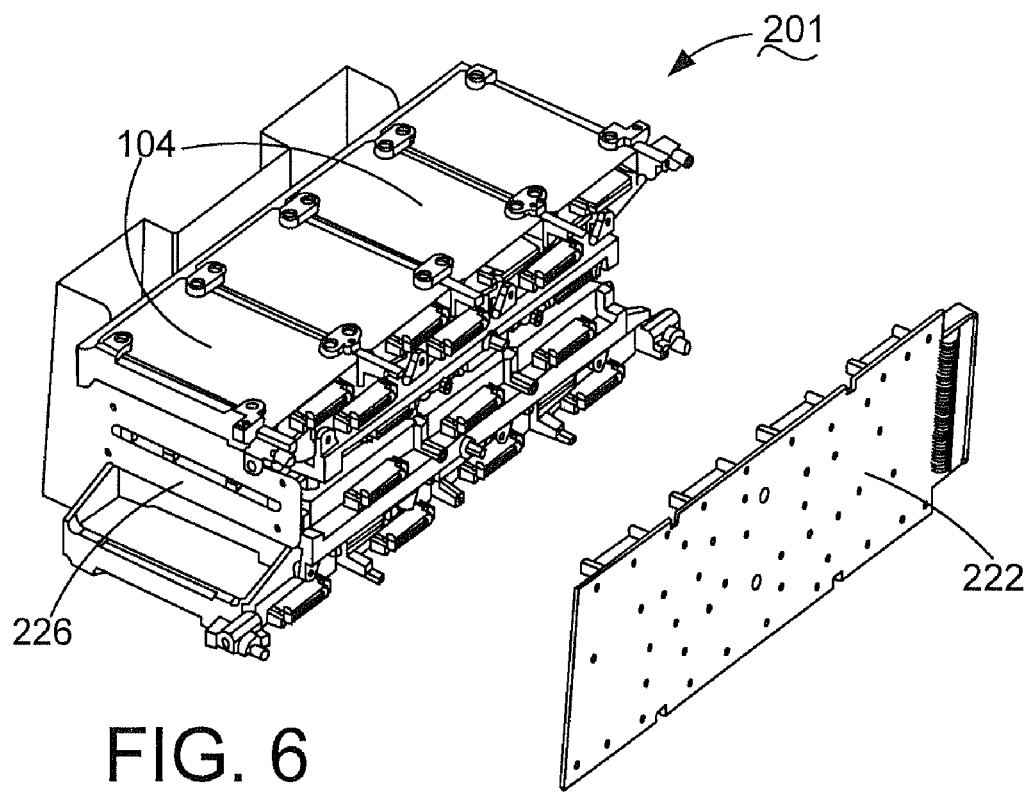
FIG. 6 is a partially exploded isometric view of the MDA of FIG. 5.

FIG. 6 depicts the MDA 201 with the enclosure 218 and door 220 removed to reveal the plurality of storage devices 104 that are all connected to the same printed circuit board 222. An upper unitary three-row partition assembly 230 is affixed to another unitary three-row partition assembly 230 by a bracket 226 attached with fasteners, such as but not limited to threaded fasteners, passing through apertures 227 and engaging the each of the unitary three-row partition assemblies 230. The printed circuit board 222 is attached to each unitary three-row partition assembly 230 with a plurality of fasteners (not shown), and a post 229 from each unitary three-row partition assembly 230 matingly engages an aperture 231 in the printed circuit board 222 in a close mating relationship.

In the illustrative embodiments that follow, the MDA 201 containerizes twenty 2.5 inch form factor storage devices 104 by connecting all twenty to the same printed circuit board 222 which, in turn, is operably connected to the backplane 209 (FIG. 4).

Figure 7:
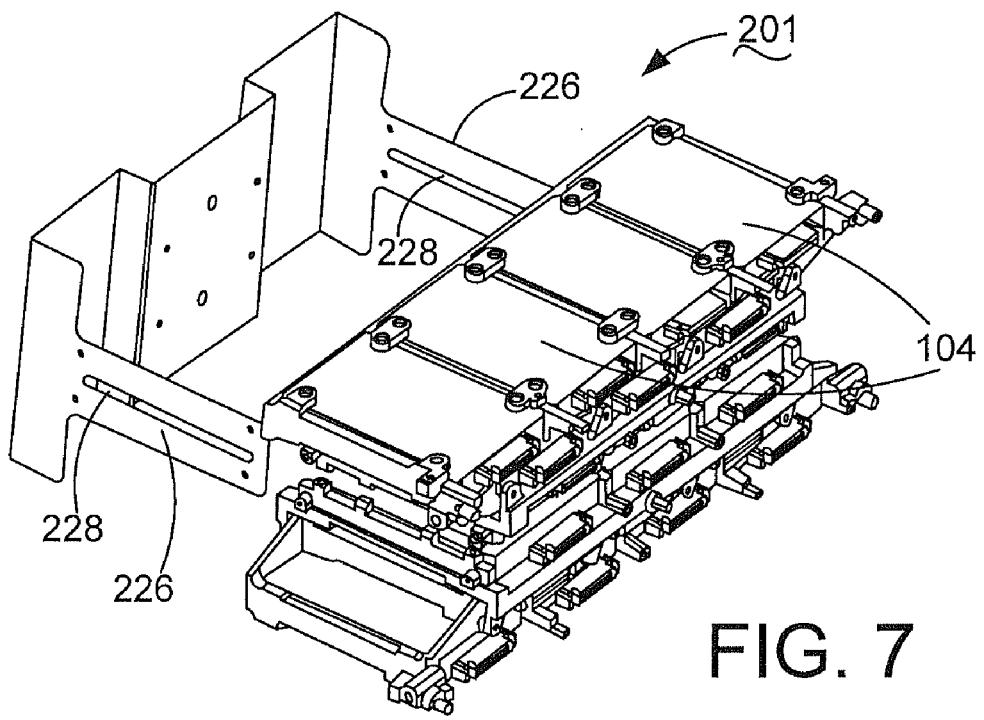
FIG. 7 is a more exploded isometric view of the MDA of FIG. 6.

FIG. 7 depicts the MDA 201 with the bracket 226 removed to reveal the twenty storage devices 104 arranged in two outside rows of four storage devices and four inner rows of three storage devices each. Note that the bracket 226 has slotted openings 228 so that an airflow can pass through the spaces within the containerized storage devices 104 for heat transfer purposes. Note also that posts (not shown) extend from each of the unitary three-row partition assemblies 230 to matingly engage apertures 233 in the bracket 226.

Figure 8:
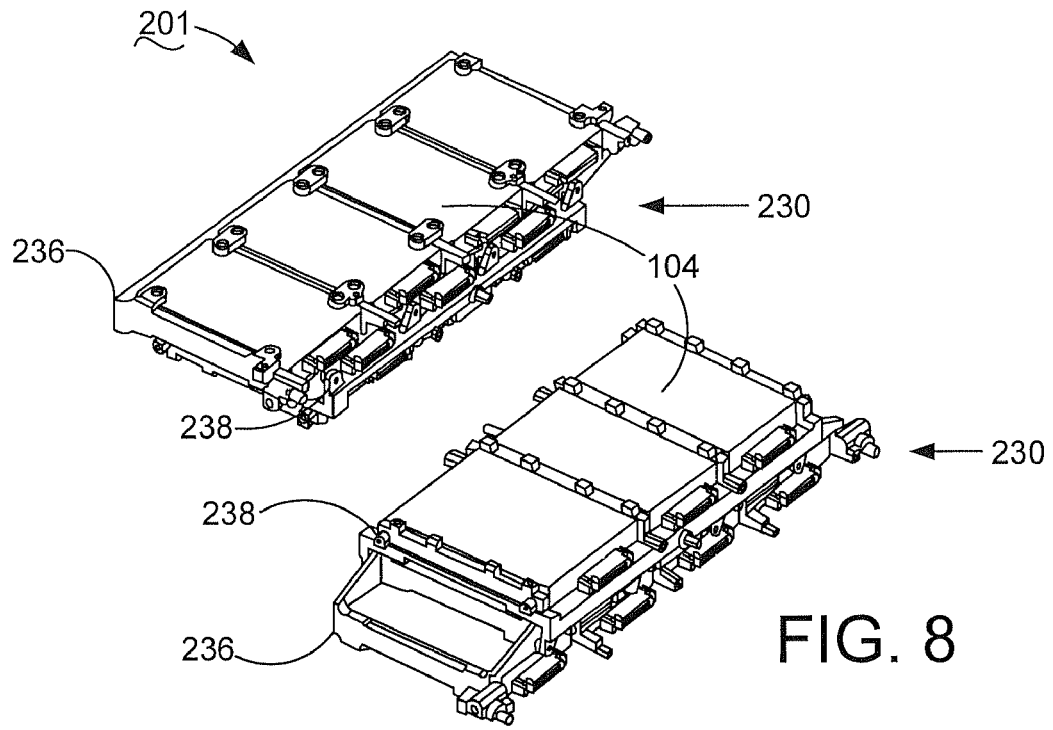
FIG. 8 is a more exploded isometric view of the MDA of FIG. 7.

FIG. 8 is an exploded isometric view showing how the twenty storage devices 104 are split into two unitary three-row partition assemblies 230. Both are denoted with the same reference number because they are substantially identical assemblies in a mirror arrangement. In some embodiments only one of the two unitary three-row partition assemblies 230 can be used to provide an MDA 201 with ten storage devices 104, such as the ten 2.5 inch form factor storage devices 104 depicted.

Figure 9:
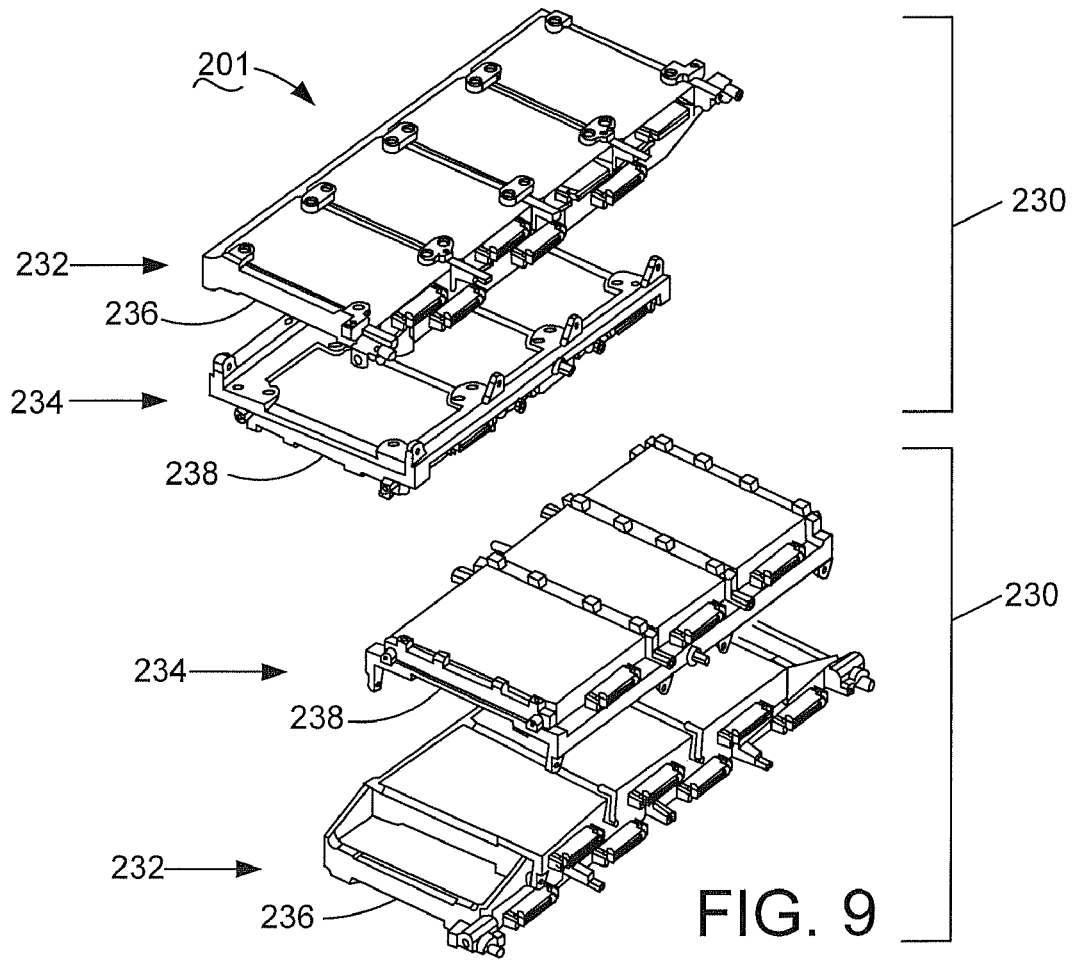
FIG. 9 is a more exploded isometric view of the MDA of FIG. 8.

FIG. 9 is yet another exploded detail showing how each of the unitary three-row partition assemblies 230 are made by attaching together a unitary two-row partition assembly 232 and a unitary one-row partition assembly 234. For purposes of this description and meaning of the appended claims, "unitary" means that the "unitary partition" or "unitary partition assembly" exists as a structural unit with the denoted number of rows of storage devices. That is, a unitary two-row partition has exactly two rows, no more and no less, and a unitary three-row partition assembly likewise has exactly three rows of storage devices.

Again, the unitary two-row partition assemblies 232 are substantially identical as are the unitary one-row partition assemblies 234. That is, the unitary two-row partition assembly 232 has a unitary two-row partition 236 to which seven storage devices 104 can be attached, and the unitary one-row partition assembly 234 has a unitary one-row partition 238 to which three storage devices 104 can be attached.

By making the unitary six-row partition assembly in this manner, access is made available to attach each of the storage devices 104 in an abutting engagement against a framework provided by the unitary two-row partition 236 and the unitary one-row partition 238. As discussed more fully below, the present embodiments permit attaching each of the storage devices 104 to a framework in a four point attachment, which advantageously damps vibration and noise from the storage devices 104. Making the entire unitary six-row partition assembly from only two unique components, the unitary two-row partition 236 and the unitary one-row partition 238, advantageously reduces manufacturing cost and complexity.

Figure 10:
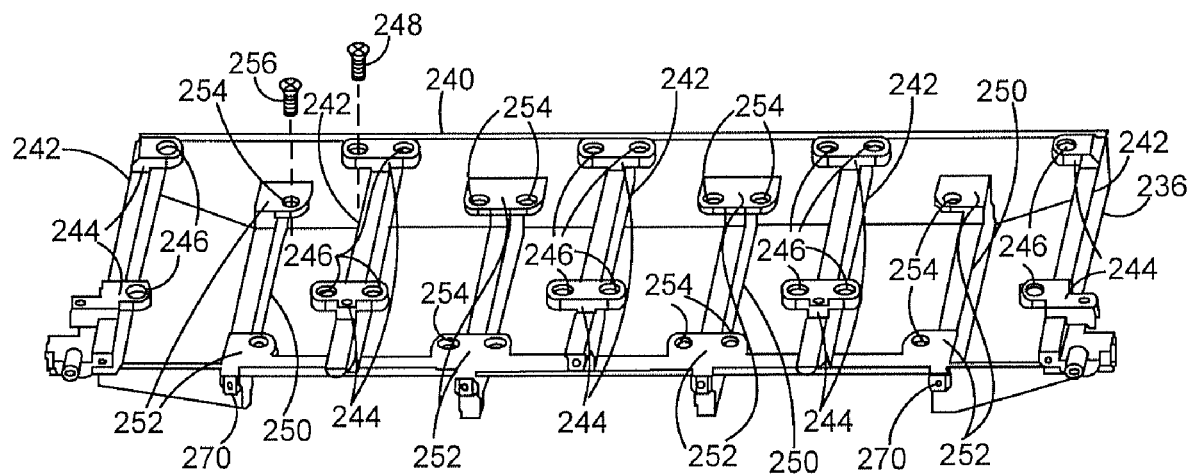
FIG. 10 is an isometric view of the two unique unitary partitions in the MDA of FIG. 5.
Figure 10:
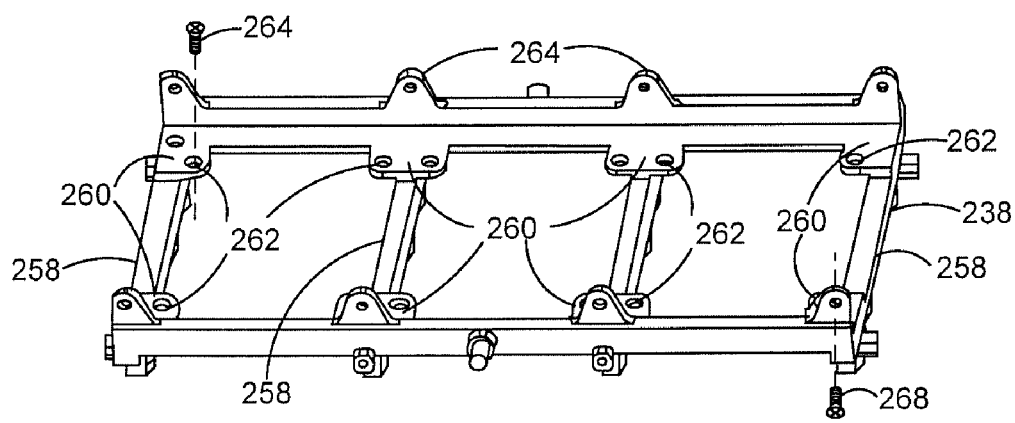

FIG. 10 is an exploded isometric view of the unitary two-row partition 236 and the unitary one-row partition 238 with the storage devices 104 removed in order to show mounting details for the storage devices 104. The unitary two-row partition 236 has a longitudinal end member 240 and a plurality of first support members 242 extending from the end member 240. Each of the first support members 242 supports a first set of coplanar engagement members 244, and each engagement member 244 defines apertures 246 configured for passing first fasteners 248 (such as but not limited to threaded fasteners, only one depicted) therethrough to affix a storage device 104 to the respective engagement member 244. Note that the first support members 242 and first engagement members 244 form receptacles for receivingly engaging the storage devices 104 and defining a first row of them.

The unitary two-row partition 236 also has a plurality of second support members 250 extending from the end member 240. Each of the second support members 250 defines a second set of coplanar engagement members 252, and each engagement member defines apertures 254 configured for passing second fasteners 256 (such as but not limited to threaded fasteners, only one depicted) therethrough to affix a storage device 104 to the respective engagement member 252. Note that the second support members 250 and second engagement members 252 form receptacles for receivingly engaging the storage devices 104 and defining a second row of them adjacent to and parallel with the first row.

The unitary one-row partition 238 has a plurality of third support members 258, with each support member 258 defining a third set of coplanar engagement members 260. Each engagement member 260 defines apertures 262 configured for passing third fasteners 264 (such as but not limited to threaded fasteners, only one depicted) therethrough to affix a storage device 104 to the respective engagement member 260.

The unitary one-row partition 238 also forms a number of upstanding tabs 265 defining apertures 266 for passing fourth fasteners 268 (such as but not limited to threaded fasteners, only one depicted) therethrough to engage mating attachment portions 270 (such as but not limited to threaded openings) in the unitary two-row partition 236. Note that, in the operable attachment of the unitary two-row partition 236 and the unitary one-row partition 238, the third support members 258 and third engagement members 260 form receptacles for receivingly engaging the storage devices 104 and defining a third row of them adjacent to the second row and parallel to the first and second rows.

As mentioned previously, an advantageous feature of the present embodiments is that each of the storage devices 104 can be individually affixed to the framework provided by the unitary two-row partition 236 and the unitary one-row partition 238. In the illustrative embodiments each storage device 104 is actually mounted in a four-point attachment to the framework. For gaining access for the fasteners 256, the first support members 242 and the second support members 250 are staggered. That is, the support members 242, 250 are staggered so that the respective mounting apertures 246, 254 are not coaxially aligned. This permits installing the fasteners 248, 256 in the same direction so that like storage devices 104 will rotate in the same direction in the first and second rows of the unitary two-row partition 236.

By attaching the third fasteners 250 in the same direction as the fasteners 248, 256, then like storage devices 104 will rotate in the same direction in the entire unitary three-row partition assembly 230, which is made up of the unitary two-row partition 236 combined with the unitary one-row partition 238. Because one unitary three-row partition assembly 230 is the mirror arrangement of another in the unitary six-row partition assembly (FIGS. 6 and 7), then the storage devices 104 in different unitary three-row partition assemblies 230 rotate oppositely with respect to each other. This advantageously balances the rotational excitation of all the storage devices within the unitary six-row partition assembly.

The disclosed embodiments are illustrative of and not limiting with respect to all embodiments contemplated by the claimed invention. For example, the number of storage devices 104 in each row can be altered within the contemplated embodiments. Furthermore, although the receptacles in a unitary two-row partition 236 are staggered for fastener access, the receptacles in adjacent rows between the unitary two-row partition 236 and the unitary one-row partition 238 can be staggered or they can be substantially aligned. Furthermore, although threaded fasteners are presented for discussion, other types of fasteners such as but not limited to rivets and the like can readily be used in alternative equivalent embodiments.

Generally, the present embodiments contemplates a multiple drive array having a printed circuit board 222 configured for connecting to a plurality of storage devices 104, and means for aligning the plurality of storage devices 104 in a dense multiple row arrangement by a paired mirrored combination of unitary partition member 236 and unitary partition member 238. For purposes of this description and meaning of the appended claims, "means for aligning" is expressly limited to the structure disclosed herein and structural equivalents thereof that are capable of providing a dense containerization of the storage devices with a minimum number of unique parts. However, the containerization requires that each of the storage devices be positively affixed to a framework to damp vibrations and noise generated by the storage device during operation.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular configuration of the channel surfaces defining the channels without departing from the spirit and scope of the present invention.

What is claimed is:

1. A multiple drive array comprising:
    a unitary two-row partition comprising:
    a longitudinal end member;
    a plurality of first support members extending from the end member and supporting, in turn, a first set of coplanar engagement members defining apertures therethrough which first fasteners pass to affix a first plurality of data storage devices to the first engagement members defining a first row of data storage devices; and
    a plurality of second support members extending from the end member and defining a second set of coplanar engagement members defining apertures therethrough which second fasteners pass in the same direction as the first fasteners to affix a second plurality of data storage devices to the second engagement members defining a second row of data storage devices adjacent to and parallel with the first row.

2. The multiple drive array of claim 1 comprising:
    a unitary one-row partition comprising:
    a plurality of third support members defining a third set of coplanar engagement members defining apertures configured for passing third fasteners therethrough to affix a third plurality of data storage devices to the third engagement members defining a third row of data storage devices; and
    a plurality of tabs extending from the third support members and defining apertures for passing fourth fasteners therethrough to engage attachment portions of the unitary two-row partition to affix the partitions together as a unitary three-row partition assembly.

3. The multiple drive array of claim 1 wherein the first and second support members are in a staggered arrangement so that the apertures in the respective first and second support members are not coaxially aligned.

4. The multiple drive array of claim 2 wherein each of the first, second, and third fasteners are threaded fasteners, and wherein each of the first, second and third plurality of data storage devices are operably affixed to the respective engagement members via four threaded fasteners.

5. The multiple drive array of claim 4 further comprising another unitary two-row partition connected to another unitary one-row partition to form a second unitary three-row partition assembly, wherein the unitary three-row partition assemblies are removably affixed together to form a unitary six-row partition assembly.

6. The multiple drive array of claim 5 wherein the unitary two-row partitions are substantially identical and the unitary one-row partitions are substantially identical.

7. The multiple drive array of claim 5 wherein all data storage devices within the same unitary three-row partition assembly operably rotate in the same direction.

8. The multiple drive array of claim 5 wherein all data storage devices in one unitary three-row partition assembly operably rotates oppositely to all data storage devices in the other unitary three-row partition assembly.

9. The multiple drive array of claim 5 wherein the two unitary three-row partition assemblies are affixed together by a bracket attached to each of the respective unitary three-row partition assemblies, the bracket defining an opening permitting an air flow between the two unitary three-row partition assemblies for heat transfer.

10. The multiple drive array of claim 2 wherein the unitary three-row partition assembly supports ten 2.5 inch form factor data storage devices as a multiple drive array storage unit.

11. The multiple drive array of claim of claim 6 wherein the unitary six-row partition assembly supports twenty 2.5 inch form factor data storage devices as a multiple drive array storage unit.

12. The multiple drive array of claim 11 wherein all the data storage devices are connected the same printed circuit board.

13. A method for containerizing a plurality of storage devices in a multiple drive array, comprising:
    positioning a first storage device in a unitary two-row partition having a first receptacle of a first plurality forming a first row of receptacles;
    affixing the first storage device to the first receptacle by passing fasteners in a direction substantially orthogonal to the first storage device through apertures defined by the first receptacle to engage the first storage device;
    positioning a second storage device in a second receptacle of a second plurality forming a second row of receptacles, the operable position of the second storage device thereby blocking access to at least one of the fasteners used in the affixing the first storage device step; and
    affixing the second storage device to the second receptacle by passing fasteners in the same direction as in the affixing the first storage device step through clearance apertures defined by the second receptacle to engage the second storage device.

14. The method of claim 13 wherein both affixing steps are characterized by employing threaded fasteners.

15. The method of claim 14 wherein both affixing steps are characterized by employing four threaded fasteners for affixing each storage device.

16. The method of claim 14 comprising:
    positioning a third storage device in a unitary one-row partition having a third receptacle of a third plurality forming a third row of receptacles;
    affixing the third storage device to the unitary one-row partition; and
    affixing the unitary one-row partition to the unitary two-row partition to form a unitary three-row partition assembly.

17. The method of claim 16 comprising affixing two unitary three-row partition assemblies together to form a unitary six-row partition assembly, wherein the unitary three-row partition assemblies have substantially identical unitary two-row partitions and substantially identical unitary one-row partitions.

18. The method of claim 17 wherein the affixing the first, second, and third storage device steps are characterized by all the storage devices within the same unitary three-row partition assembly rotating in the same direction, and storage devices in different unitary three-row partition assemblies rotating in opposite directions with respect to each other.

19. The method of claim 17 wherein the affixing the first, second, and third storage device steps are characterized by affixing twenty 2.5 inch form factor storage devices to the unitary six-row partition assembly, and connecting all of the twenty storage devices to the same printed circuit board.

* * * * *